G. C. W. GOSS.
TOOL HOLDER.
APPLICATION FILED OCT. 5, 1917.

1,290,541.

Patented Jan. 7, 1919.
2 SHEETS—SHEET 1.

Inventor:
George C. W. Goss,
By Frederick V. Winter
Attorney.

G. C. W. GOSS.
TOOL HOLDER.
APPLICATION FILED OCT. 5, 1917.
1,290,541.
Patented Jan. 7, 1919.
2 SHEETS—SHEET 2.
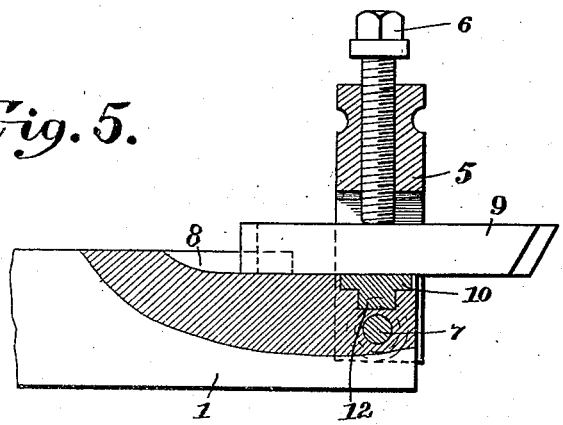
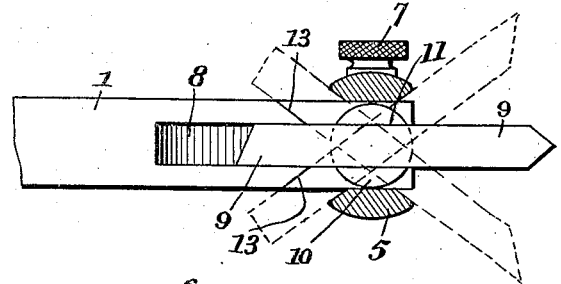
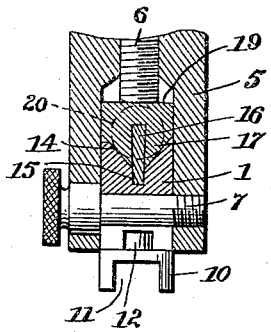
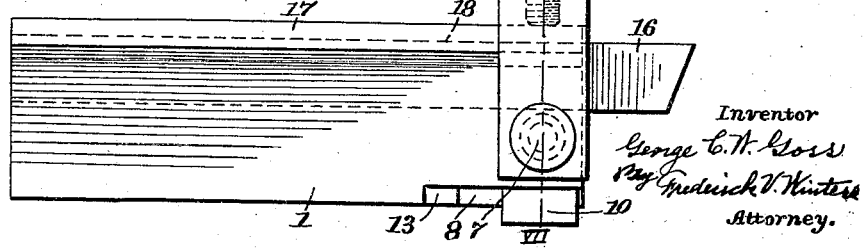
Inventor
George C. W. Goss
By Frederick V. Winters
Attorney.

UNITED STATES PATENT OFFICE.

GEORGE C. W. GOSS, OF WEST ENGLEWOOD, NEW JERSEY.

TOOL-HOLDER.

1,290,541. Specification of Letters Patent. Patented Jan. 7, 1919.

Application filed October 5, 1917. Serial No. 194,857.

*To all whom it may concern:*

Be it known that I, GEORGE C. W. GOSS, a citizen of the United States, residing at West Englewood, in the county of Hudson and State of New Jersey, have invented certain new and useful Improvements in Tool-Holders, of which the following is a full, clear, and exact specification.

This invention relates to tool holders for lathes, boring machines, etc., and has for its object to provide a universal tool holder adapted to support various tools for a variety of purposes, whereby one holder of this kind will meet the requirements heretofore necessitating the keeping on hand of several different tool holders.

A further object is to provide a holder capable of adjustment for holding finishing or other tools at different angles. Other objects will appear as the description proceeds.

The invention will be first hereinafter described in connection with the accompanying drawings, which constitute part of this specification, and then more specifically defined in the claims at the end of the description.

In the accompanying drawings, wherein similar reference characters are used to designate corresponding parts throughout the several views:—

Fig. 5 is a broken section through the same parts taken at right angles to Fig. 4 on the line V—V of Fig. 3.

Fig. 6 is a section on the line VI—VI of Fig. 2, showing in broken lines the positions of the swiveled saddle when inclined tools are used.

Fig. 7 is a section on the line VII—VII of Fig. 8, and Fig. 8 is a side view of the holder reversed and carrying a cutting off tool.

It will be understood that the universal tool holder constituting this invention is designed to have its shank 1 clamped in the turret 2 on the carriage 3 of a lathe or boring machine 4, and that the holder is equipped with means for clamping various kinds of tools thereto in different position to accomplish the several kinds of work. The shank is generally rectangular in cross section to fit the turret, and is equipped at one end with means for holding finishing tools at different angles, and cutting off tools, boring tools, etc.

Figure 1:
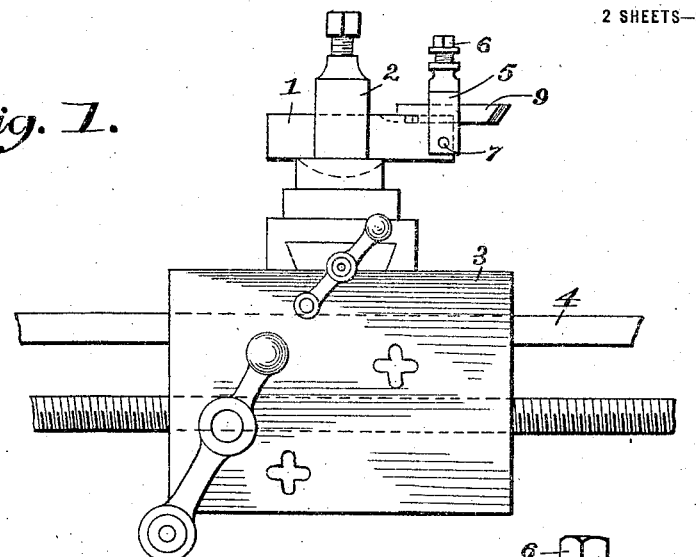
Figure 1 is an elevation of a lathe carriage and turret showing the holder in position in the turret and a finishing tool carried by the holder in alinement therewith.
Figure 2:
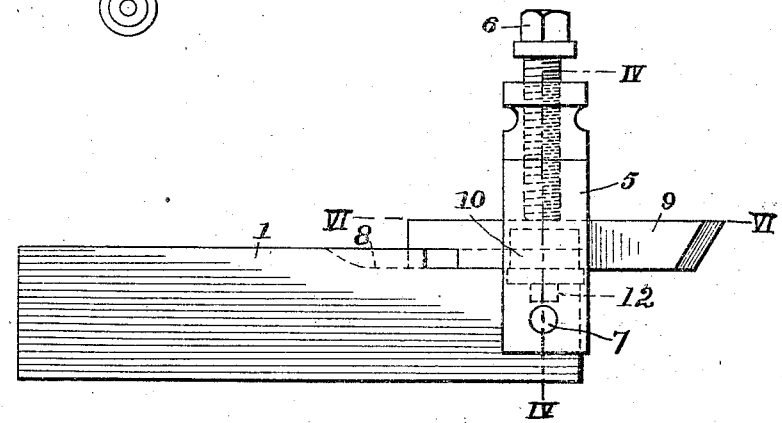
Fig. 2 is a detailed view of the holder alone, showing more clearly the means for clamping the tool.
Figure 3:
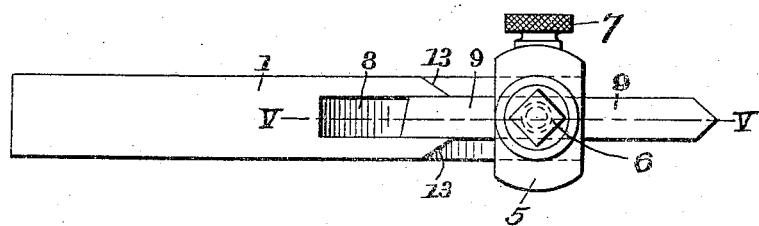
Fig. 3 is a plan view of the same.
Figure 4:
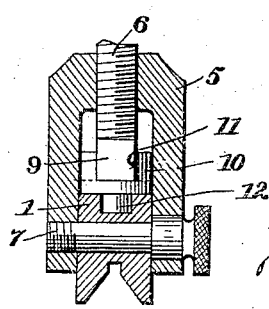
Fig. 4 is a section on the line IV—IV of Fig. 2 to illustrate the swiveled saddle for the tool.

The tool supporting end of the holder, as illustrated in the drawings, has a yoke 5 swiveled centrally thereon at 7 to swing to either side, and said yoke is equipped with a clamping bolt 6. One edge, the upper one in Figs. 2 and 5, of the holder has a longitudinally extending groove 8 cut in its right hand end portion of a size to fit a finishing tool 9 and hold the same in alinement with the holder when the clamping bolt 6 is turned down, as shown in Fig. 2. Swiveled in the edge of the holder in line with the yoke is a saddle piece 10 having a groove 11 adapted to be arranged to register with the groove 8 or to be swung around on its swivel lug 12 so as to stand obliquely across said groove 8, as indicated in Fig. 6. Inclined shoulders 13 at the sides of the groove 8 serve to retain the tool when set in either of the inclined or oblique positions.

The opposite edge of the shank of the holder has a longitudinally extending V-shaped groove 14 therein with a narrow rectangular groove 15 at its bottom to receive a cutting off tool 16, Figs. 7 and 8, when the holder is reversed or turned over. A clamping bar 17 having one edge formed to fit the V-shaped groove 14, and a rectangular groove 18 corresponding to the groove 15, is used with the cutting off tool, and the clamping bolt 6 of the yoke 5 bears against the flat outer face 19 of said bar 17 so as to prevent the thin edge of the tool being upset by said bolt. This clamping bar is dispensed with when a tool, with a round shank indicated in broken lines at 20 in Fig. 7, is clamped in the V-shaped groove 14.

Having thus described my invention, what I claim as new and desire to secure by Letters Patent of the United States is:

1. A tool holder comprising a shank having a longitudinal groove in one end, an oblique shoulder at one side thereof, and a yoke pivoted to the shank astride the groove for clamping a tool in said groove so as to extend in line with the shank, or against said oblique shoulder so as to extend at an angle to the shank.

2. A tool holder comprising a shank having a longitudinal groove therein and an oblique shoulder at one side thereof, a saddle piece swiveled on the shank and having a groove to register with the groove in the shank or the shoulder, and a yoke pivoted to the shank astride the groove therein for clamping a tool in the groove in the saddle piece with the inner end of said tool either in the groove in the shank or against the shoulder, for the purposes specified.

3. A tool holder comprising a shank having a longitudinal groove therein and an oblique shoulder at one side thereof, a saddle piece swiveled on the shank and having a groove to register with the groove in the shank or with the shoulder, and a yoke pivoted to the shank astride the groove therein and in line with the swivel axis of the saddle piece for clamping a tool in the groove in the saddle piece with the inner end of said tool either in the groove in the shank or against the shoulder, for the purpose specified.

4. A tool holder comprising a shank having a longitudinal groove and oppositely inclining shoulders at the sides thereof, a saddle piece swiveled on the shank and having a groove therein adapted to be arranged in line with the groove in the shank or in line with either of the shoulders, and a yoke adapted to retain a tool in the groove of the saddle piece with the inner end of said tool either in the groove in the shank or against one of the shoulders, for purposes specified.

5. A tool holder having a shank provided with a V-shaped groove in its edge and a rectangular groove at the base of the V-shaped groove, the rectangular groove being adapted to hold a flat tool, and the V-shaped groove being designed for holding a tool with a round shank, and a yoke for retaining a tool in either of said grooves.

6. A tool holder having a shank provided with a V-shaped groove in its edge and a rectangular groove at the base of the V-shaped groove, a clamping bar having a V-shaped edge to fit the V-shaped groove in the shank of the tool holder, said clamping bar also having a rectangular groove in its V-shaped edge to hold a flat tool when fitted in the rectangular groove in the tool holder, and a yoke adapted to retain the clamping bar and tool in position.

In testimony whereof I have signed my name to this specification.

GEORGE C. W. GOSS.

Copies of this patent may be obtained for five cents each, by addressing the "Commissioner of Patents, Washington, D. C."